(12) United States Patent
Segman (10) Patent No.: US 7,535,498 B2
(45) Date of Patent: May 19, 2009

(54) ELECTRONIC VIEWING DEVICE

(75) Inventor: Yosef Segman, Zichron Yaacov (IL)

(73) Assignee: Cnoga Medical Ltd., Zichron Yaakov (IL)

( * ) Notice: Subject to any disclaimer, the term of this patent is extended or adjusted under 35 U.S.C. 154(b) by 641 days.

(21) Appl. No.: 11/025,981

(22) Filed: Jan. 3, 2005

(65) Prior Publication Data
US 2006/0146169 A1    Jul. 6, 2006

(51) Int. Cl.
*H04N 5/262* (2006.01)
(52) U.S. Cl. .................. 348/239; 348/42; 359/407; 345/7
(58) Field of Classification Search ............. 348/42–60, 348/207.99, 239, 335, 337, 340, 376; 345/7, 345/8, 9, 419; 359/353, 361, 363, 407–418, 359/480–482; 382/154, 254; 396/51; 356/138
See application file for complete search history.

(56) References Cited

U.S. PATENT DOCUMENTS

| | | | | |
|---|---|---|---|---|
| 5,825,480 | A * | 10/1998 | Udagawa | ............. 356/138 |
| 6,055,376 | A * | 4/2000 | Ohtaka et al. | ............. 396/51 |
| 6,178,272 | B1 | 1/2001 | Segman | |
| 6,181,302 | B1 * | 1/2001 | Lynde | ............. 345/7 |
| 6,191,827 | B1 | 2/2001 | Segman et al. | |
| 6,549,650 | B1 | 4/2003 | Ishikawa | |
| 6,587,012 | B1 | 7/2003 | Farmer et al. | |
| 7,158,296 | B1 * | 1/2007 | Schwartz et al. | ............. 359/407 |
| 2002/0063955 | A1 * | 5/2002 | Nishida et al. | ............. 359/361 |
| 2002/0109785 | A1 * | 8/2002 | Hammack et al. | ............. 348/376 |
| 2003/0007079 | A1 | 1/2003 | Sisselman | |
| 2003/0210832 | A1 | 11/2003 | Benton | |
| 2004/0156554 | A1 * | 8/2004 | McIntyre | ............. 382/254 |
| 2004/0257648 | A1 * | 12/2004 | Mogamiya | ............. 359/407 |
| 2005/0068314 | A1 * | 3/2005 | Aso et al. | ............. 345/419 |
| 2006/0098277 | A1 * | 5/2006 | Huang | ............. 359/409 |
| 2007/0211148 | A1 * | 9/2007 | Lev et al. | ............. 348/207.99 |
| 2008/0013166 | A1 * | 1/2008 | Haisch et al. | ............. 359/353 |

* cited by examiner

*Primary Examiner*—Tuan V Ho
*Assistant Examiner*—Dennis Hogue
(74) *Attorney, Agent, or Firm*—Mark M. Friedman (57) ABSTRACT

Electronic viewing devices including image sensors, image processing units, image displays devices, and optional viewfinders are disclosed. Optionally, the image processing unit is configured to produce a distorted image. In some embodiments, the production of the distorted image include using at least one distorting algorithm including coordinate transformations, time transformations, a color transformations a value transformation, and any combination thereof. Optionally, the distorted image is superimposed on a preserved image to form a hybrid image. Exemplary image sensors include but are not limited to visible light sensors, magnetic sensor, heat sensor, infra red sensor, echo location sensor, radio location sensor, remote location reporting sensor, proximity sensor, motion sensor, or a combination thereof. In some embodiments, the present invention provides a device that wherein the image processing unit includes an image classifier, and alphanumeric electronic data based upon a classified image is displayed by the displayed device and viewed through a viewfinder.

19 Claims, 12 Drawing Sheets

ELECTRONIC VIEWING DEVICE

FIELD OF INVENTION

The present invention relates to digital image processing, and more particularly, to electronic viewing devices including stereoscopic devices for displaying an electronically processed 3D visual manifold.

BACKGROUND OF THE INVENTION

Electronic viewing devices such as digital cameras and video cameras including electronic sensors and image processing device are well known in the art. These devices are very popular for recording and storing sensed images and 3D visual manifolds. Generally, the image processing device embedded in the electronic viewing device employs image correcting algorithms to improve the quality of the image of a sensed audio and/or visual scenario and to compensate for factors such as poor sensor quality, poor lighting, distance of a viewed object, and the like.

Electronic devices including monocular, binocular and stereoscopic displays for viewing a modified reality are also known in the art. For example, virtual reality and augmented reality systems are used in a plethora of applications, including leisure applications such as computer gaming, military and corporate training, and in virtual libraries, museums, and shops. There is an ongoing need for electronic viewing devices that provide means for viewing a modified reality and in particular for providing new sensation of the real 3D visual manifold.

Below is enumerated a list of U.S. patents and published U.S. patent application that disclose potentially relevant related art. Each of the following U.S. patents and published U.S. patent application are incorporated herein by reference in its entirety:

U.S. Pat. No. 6,587,012 of Khoshnevis et al.;
US Patent Application 2003/0007079 of Sisselman;
US Patent Application 2002/0109785 of Hammack;
US Patent Application US 2003/0210832 of Benton.

SUMMARY OF THE INVENTION

It is now disclosed for the first time an electronic viewing device including one or more image sensors, at least one image processing unit, and one or more display devices. According to some embodiments, one or more image processing devices are programmed to deliberately alter a sensed electronic image to produce a modified image including a distorted image. Optionally, this distorted real time image is electronically or optically superimposed or blended with an observed or electronically preserved image reflecting a real time visual scenario, to form a real time hybrid image. This real time hybrid image is displayed to a viewer, providing new sensation of the real 3D visual manifold.

In some embodiments, the electronic viewing device is an electronic binocular device.

Not wishing to be bound by theory, it is now disclosed that applications of certain disclosed electronic viewing devices include but are not limited to leisure applications, as a device for psychological therapy, gaming, medical applications, and military applications. For example, according to certain exemplary embodiments, the present inventor has found that electronic viewing devices for displaying distorted images make an excellent toy. According to some embodiments, the present inventor has found that use of electronic viewing devices for displaying distorted images has a positive mood-altering affect on the viewer, relaxes the viewer, and thus electronic viewing devices for displaying distorted images are useful in psychotherapy.

Not wishing to be bound by theory, it is disclosed that in some embodiments, viewing a deliberately distorted image or a hybrid image including a distorted image allows a user to experience a hallucinatory effect without the well known detrimental effects associated with chemically induced hallucinations.

According to some embodiments, one or more image processing units include a classifier algorithm for classifying a sensed electronic image.

It is now disclosed for the first time an electronic viewing device including a housing, at least one image sensor for producing a sensed electronic image from an observed image, attached to the housing, an image processing unit for producing at least one processed image including at least one modified image including a distorted image, at least one image display unit for displaying at least one processed image, attached to the housing, and at least one viewfinder for viewing at least one processed image including the modified image, attached to the housing.

According to some embodiments, at least one modified real time image further includes a preserved image superimposed on the distorted image. In particular embodiments, this real time modified image is superimposed over the preserved image representing a real time sensed 3D visual manifold.

According to some embodiments, the real time preserved image includes an image obtained from an optical light sensor including a visible sensor, a thermal sensor, a UV sensor, and a IR sensor.

According to some embodiments, the production of the distorted image includes using at least one distorting algorithm selected from the group consisting of local Fourier transformations, convolutions, neural networks, texture based algorithms such as line integral convolutions (LIC), algorithms that introduce white noise, wavelets, partial differential operator transformations, algorithms where the output is the solution to a partial differential equations wherein on or more parameters of the partial differential equation are derived from an inputted image, equations, fractal mechanism, finite impulse response (FIR) or infinite impulse response (IIR) filters, fractal based algorithms, algebraic techniques, and any combination thereof.

Exemplary algebraic techniques include but are not limited to iterative processing algorithms. One exemplary type of iterative algorithm is iterative linear.

In some exemplary embodiments, the partial differential equation is a heat equation.

In some embodiments, the production of the distorted image includes employing at least one distorting algorithm.

In some embodiments, at least one distorting algorithm includes a linear or non-linear coordinate transformation. One exemplary such coordinate transformation is the transformation of a Cartesian coordinate system into a spherical coordinate system.

In some embodiments, at least one distorting algorithm includes a linear or non-linear time transformation. Exemplary time transformations include those which decelerate and/or accelerate and/or reverse the presentation of a developing electronic image scenario with respect to time. In exemplary embodiments, the time transformation includes a time delay between a time an observed image is sensed and the time an electronic image is displayed. In some embodiments, this time delay is at most $1/120$ seconds. In some embodiments, this time delay is at most $1/60$ seconds. In some embodiments, this time delay is at most 1/30 seconds. In some embodiments the time delay is zero or other constant time delay.

In exemplary embodiments, time distortion is implemented using a memory buffer which stores a real time electronic image for playback. In some embodiments, the memory buffer includes volatile memory. In some embodiments, the memory buffer excludes persistent storage.

In some embodiments, at least one distorting algorithm includes a coordinate transformation. One exemplary such coordinate transformation is the transformation of a Cartesian coordinate system into a spherical coordinate system. The skilled artisan is directed to U.S. Pat. No. 6,178,272 of the present inventor entitled "Non-linear and Linear method of scale up or scale down Image resolution conversion," incorporated herein by reference in its entirety, as well as to U.S. Pat. No. 6,191,827 of the present inventor and coworkers, entitled "Electronic keystone correction for electronic devices with a visual display," incorporated herein by reference in its entirety, for discussions of distorting coordinate transformations.

In some embodiments, at least one distorting algorithm includes a color transformation. One exemplary color transformation is a transformation that receives three red-green-blue input function, R(x,y), G(x,y), B(x,y) and outputs transformed color functions in a new coordinate system such as R'(R,G,B), G'(R,G,B), B'(R,G,B).

In some embodiments, at least one distorting algorithm includes a value transformation. Exemplary value transformations include but are not limit to Fourier transformations, convolutions, partial differential operator transformations and the like.

In some embodiments, the image processing unit is programmed to form the distorted image using any combination of more than one of the aforementioned distortion algorithms.

In some embodiments, the production of the distorted image includes using at least one distorting algorithm selected from the group consisting of a coordinate transformation, a time transformation, a color transformation, a value transformation, and any combination thereof.

According to some embodiments, at least one image sensor of the disclosed electronic viewing device is selected from the group consisting of visible light sensor, magnetic sensor, microphone, heat sensor, uv sensor, infra red sensor, echo location sensor, radio location sensor, remote location reporting sensor, smell sensor, wind sensor, air material sensor (oxygen, carbon dioxide, etc.), proximity sensor, motion sensor, or a combination thereof.

According to some embodiments, the electronic viewing device further includes an image recording and storing device, for recording a processed real time scenario of moving or still images and/or the hybrid real time 3D visual scenario and the processed 3D scenario of moving or still images.

According to some embodiments, the electronic viewing device further includes at least one reflecting surface for reflecting, splitting and/or collecting the observed image through at least one the viewfinder.

According to some embodiments, the electronic viewing device further includes a playback device, for playing back a prerecorded image. In some embodiments, the device is configured so that the prerecorded image from the playback device is displayed using the same electronic display device for displaying electronically processed real time images. In some embodiments, the device is configured so that the prerecorded image is superimposed over electronic images generated in real time.

According to some embodiments, the electronic viewing device includes two viewfinders including a first viewfinder configured to view a first image and a second viewfinder configured to view a second image. According to some embodiments, a distance between the first and second viewfinders is adjustable.

According to some embodiments, the image display unit is configured to display two images through two viewfinders such that two viewed images form a stereoscopic image.

According to some embodiments, the first image is derived from a first array of image sensors, and the second image is derived from a second array of image sensors, wherein the first array of sensors may include a type of sensor not included in the second array.

According to some embodiments, a left real time image viewed through a left viewfinder is derived according to a first set of image processing algorithms, and a right real time image viewed through a right viewfinder is derived according to a second set of image processing algorithms. In particular embodiments, the first set of image processing algorithms differs from the second set of image processing algorithms.

Optionally, the electronic viewing device further includes a control device. According to some embodiments, the control device is for controlling parameters associated with an image distortion algorithm and/or an image superimposition algorithm. According to some embodiments, the control device is for activating and deactivating one or more image sensors. In some embodiments the control device is operative to control the relative intensity of a modified electronic image relative to a preserved electronic image and/or an optical observed image.

According to some embodiments, the electronic viewing device further includes an image zooming device. Examples of image zooming devices include but are not limted to optical image zooming devices which alter a sensed electronic image and electronic zooming devices which do not alter a sensed image and zoom a presented image electronically, and/or combination thereof.

According to some embodiments, the electronic viewing device further includes a focusing device.

It is now disclosed for the first time electronic binoculars comprising a housing, exactly one image sensor for producing a sensed electronic image from an observed image, attached to the housing, an image processing unit for producing at least one processed image, an image display unit for displaying at least one said processed image, attached to the housing, and two viewfinders for viewing at least one processed image attached to the housing.

It is now disclosed for the first time electronic binoculars comprising a housing, at least one image sensor for producing a sensed electronic image from an observed image, attached to the housing, an image processing unit for producing at least one processed image, exactly one image display panel for displaying at least one said processed image, attached to the housing, and two viewfinders for viewing at least one processed image attached to the housing.

It is now disclosed for the first time an electronic device including at least one image sensor for producing a sensed image, an image processing unit for producing at least one processed image including at least one hybrid image including a distorted image superimposed a original preserved image or optical original image scenario, and at least one image display device for displaying at least one the processed image, wherein at least one viewed processed image includes at least one distorted image.

According to some embodiments, the preserved image includes an image obtained from an optical light sensor.

It is now disclosed for the first time an electronic viewing device including a housing, at least one image sensor for producing a sensed electronic image from an observed image, attached to the housing, an image processing unit including an image classifier for classifying at least one the sensed electronic image, an image display unit for displaying electronic data including symbolic data derived from the image classifier, attached to the housing, and at least one viewfinder for viewing the displayed electronic data, attached to the housing. In some embodiments, the symbolic data includes alphanumeric data.

According to exemplary embodiments, the image classifier is programmed to classify images according to at least one algorithm selected from the group consisting of neural networks, decision trees, decision tables, and character recognition.

These and further embodiments will be apparent from the detailed description and examples that follow.

DETAILED DESCRIPTION OF THE INVENTION

It is now disclosed for the first time an electronic viewing device including one or more image sensors, an image processing unit, and an image display unit, wherein the image processing unit is configured to distort at least one sensed electronic image and/or to classify at least one sensed electronic image using a classifier algorithm.

Figure 1:
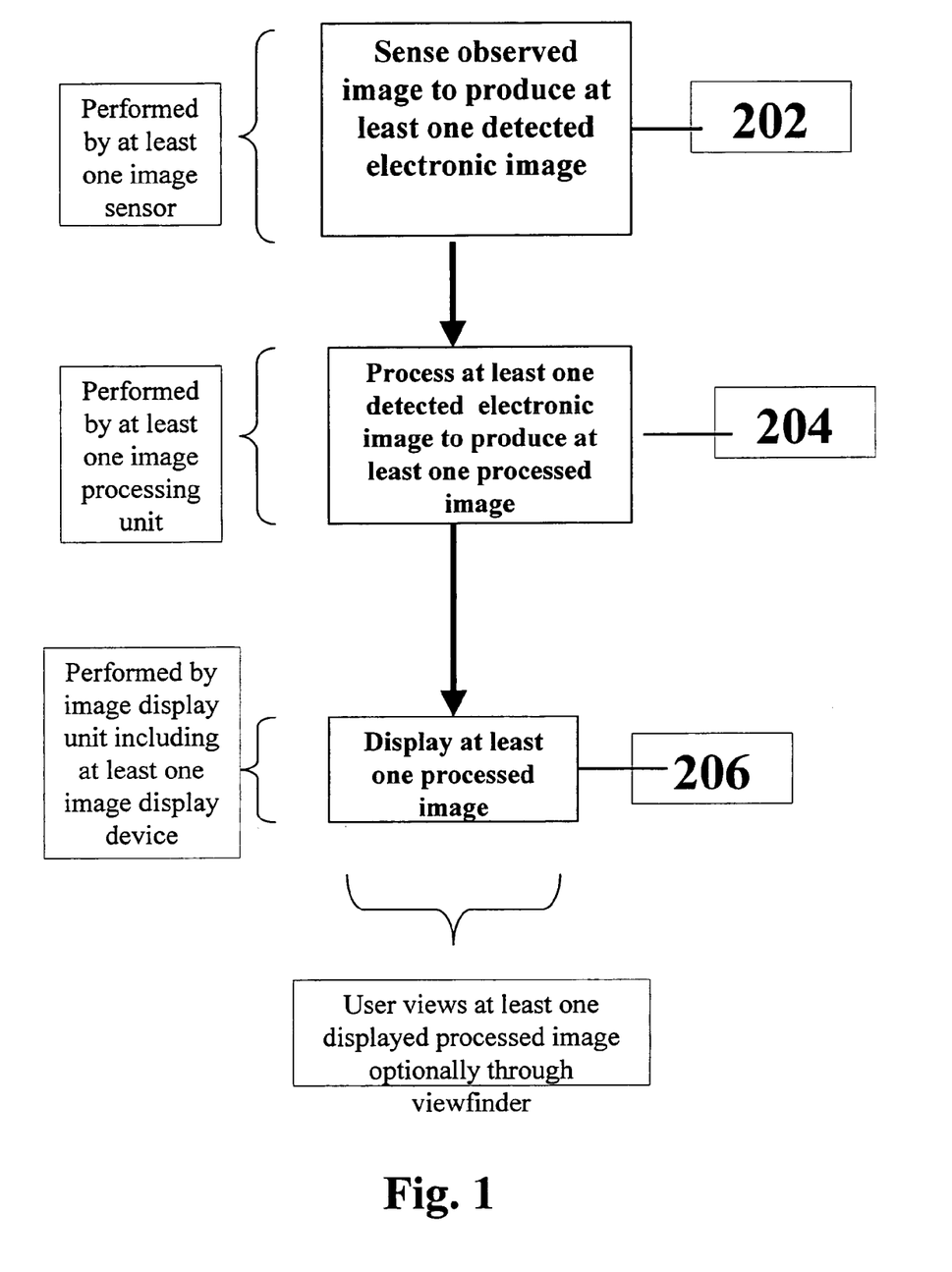
FIG. 1 provides a flowchart describing certain embodiments of the present invention.

FIG. 1 provides a flow chart detailing several embodiments of the present invention. First, one or more observed images are sensed 202 in real time with one or more image sensors to produce at least one sensed electronic image. Optionally, one or more observed images is pre-filtered by one or more front lenses or light filters. An electronic signal representing a sensed electronic image is then conveyed to an image processing unit comprising one or more image processing devices, wherein at least one sensed electronic image is processed to produce at least one processed image 204 which is subsequently displayed and viewed in real time. In some embodiments, at one processed image includes a modified image including a deliberately distorted image.

Any known algorithm for distorting an image is appropriate for embodiments of the present invention. In exemplary embodiments, at least one algorithm is selected from the group consisting of local Fourier transformations, convolutions, texture based algorithms such as line integral convolutions (LIC), algorithms that introduce white noise, wavelets, partial differential operator transformations, algorithms where the output is the solution to a partial differential equations wherein on or more parameters of the partial differential equation are derived from an inputted image, equations, finite impulse response (FIR) or infinite impulse response (IIR) filters, fractal based algorithms, and iterative processing algorithms such as algebraic techniques such as iterative linear.

As used herein, a "modified" image is an image that includes a distorted image. According to some embodiments, the modified image includes a plurality of distorted images superimposed together. According to some embodiments, the modified image also includes a preserved image merged with or superimposed on at least one distorted image.

As used herein, a "preserved" digital image refers to an electronically processed digital image other than a distorted image. According to some embodiments, the preserved digital image is identical to the sensed electronic image directly generated by one or more image sensors. According to some embodiments, the preserved digital image is electronically processed using image correcting algorithms to improve the quality of the image of a sensed image and to minimize image distortion.

As used herein, an "observed" image is an image indicative of a natural phenomenon that can be detected by one or more image sensors. The observed image is the actual natural image, untainted by an image sensor or electronic image processing. In some embodiments, the observed image is a visible light image. In some embodiments, an "observed" image is directed so as to bypass an image processing unit into the field of view of one or more viewfinders. In some embodiments, the field of view of one or more viewfinders includes both an observed image as well as one or more processed electronic images displayed using one or more electronic display devices forming a hybrid image.

As used herein, a "coordinate transformation" includes both linear as well as nonlinear coordinate transformations.

As used herein, a "time transformation" includes both linear as well as nonlinear time transformations.

As used herein, a "color transformation" includes both linear as well as nonlinear color transformations.

As used herein, a "value transformation" includes both linear as well as nonlinear value transformations.

As used herein, an "array of image sensors" is one or more image sensors. In some embodiments, the electronic viewing device includes more than one array of image sensors, and image sensors within each array are clustered in substantially one location along a horizontal axis. In some embodiments, the device includes a plurality of arrays of image sensors, and a distance between two arrays is adjustable.

In some embodiments, the image sensors include but are not limited to optical sensors such as CCD or CMOS image sensors.

Optionally, a modified image produced during a step of image processing 204 is a hybrid image including one or more deliberately distorted images superimposed on a preserved digital image.

According to embodiments of the present invention, one or more processed images are displayed 206 by one or more image display devices. Exemplary image display devices include but are not limited to liquid crystal displays (LCDS) and organic light emitting diodes (OLEDs).

Optionally, one or more processed and displayed 206 images are viewed through one or more viewfinders.

Figure 2:
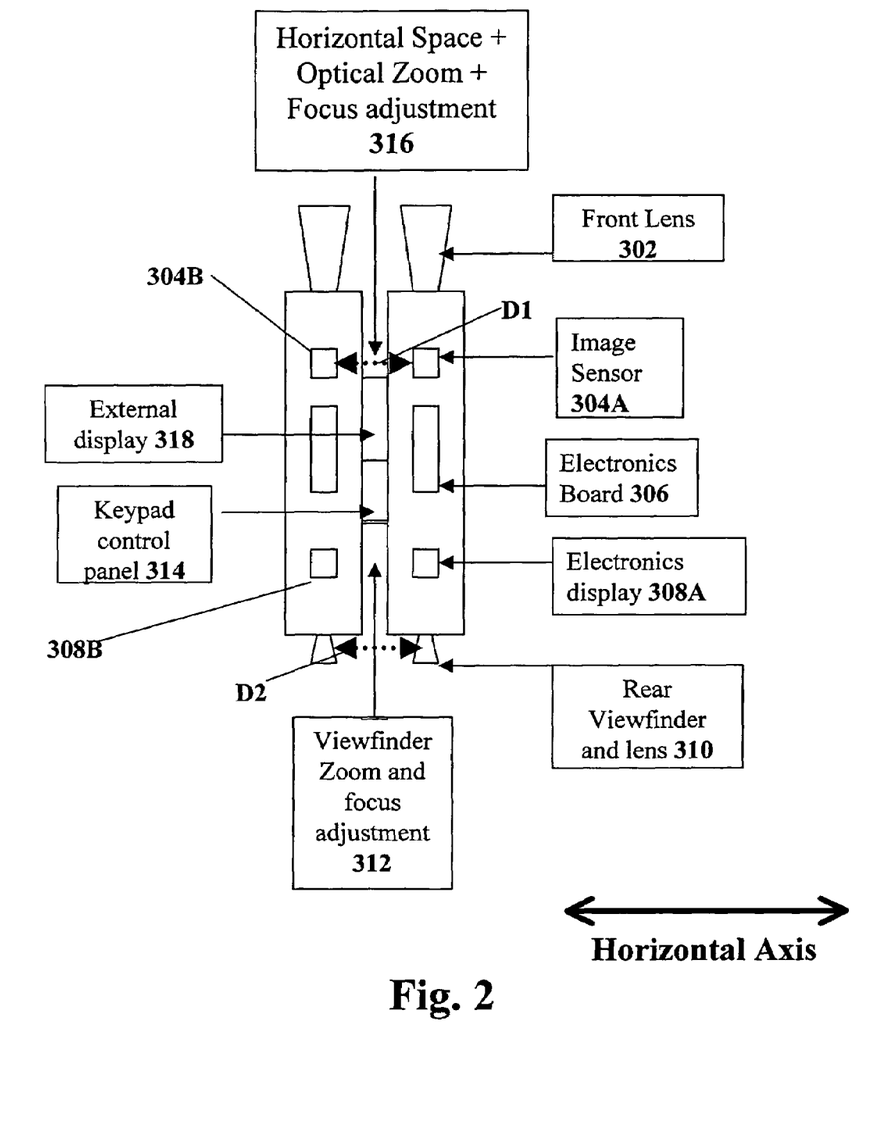
FIG. 2-FIG. 5 provide schematic diagrams of electronic binoculars according to certain embodiments of the present invention.

FIG. 2 provides an illustration of electronic binoculars according to some embodiments of the present invention. Thus, according to FIG. 2, two arrays of one or more image sensors (304A and 304B) separated by an adjustable first horizontal distance D1. According to some embodiments, each array contains only one image sensor, and the entire device has a total of two image sensors.

Thus, according to some embodiments, the device provides an optical zoom and/or focus adjustment 316.

According to particular embodiments, one or more left image sensors 304B and one or more right image sensors 304A may be of different types. Thus, in one example, a left image sensor is an optical visible light image sensor and a right image sensor is a heat sensor.

According to some embodiments, one or both of the two arrays of image sensors contain a plurality of image sensors, and within at least one such array, one or more sensors is activated so as to enable the sensor to send a sensed electronic image to an image processing unit. In some embodiments, determination of whether a particular image sensor is active or not is controlled by a keypad control panel 314.

In some embodiments, more than one sensor from a single array is active, and a processed electronic image includes a blend of images received from more than one sensor. Another example is a microphone for sensing noise that is active simultaneously with another sensor such as an optical sensor.

Optionally, optical input sensed by the image sensor 304 is filtered by one or more front lenses 302 and/or other lenses.

In exemplary embodiments, the front lens 302 includes a single or double lens. In exemplary embodiments, the front lens 302 includes a double lenticular lens or a single double focal lenticular lens.

The device shown in FIG. 2 also contains an electronics board. In some embodiments, the electronic board 306 contains an image processing unit embedded within housing that houses the device. In other embodiments, the image processing unit is outside of the device housing, and an electronic signal from any image sensor 304 is conveyed to the image processing unit using a wired or wireless connection.

In exemplary embodiments, electronic viewing device contains at least one of the following: a power supply, a memory unit, persistent storage such as a hard disk or a flash disk, speakers and/or a headset, interfaces such as a USB interface for interfacing with other electronic devices, and a remote control.

It is noted that in some embodiments, the device contains more than one electronic board 306. It is noted that in some embodiments, the image processing unit comprises more than one image processing devices. In one particular embodiment, the device contains a separate image processing device for each image sensor 304.

As used herein, the phrase "attached to housing" or "attached to said housing" implies any physical object that is attached within the device housing, or alternatively, attached to the device housing but outside of the device housing. It is noted that in some embodiments, the housing is handheld portable housing, and the electronic viewing device is a handheld, portable device.

According to embodiments described in FIG. 2, the processed electronic image is sent is then sent to one or more electronic displays (308A and 308B), and viewed through at least one rear viewfinder and optionally a rear lens 310. Optionally, the device includes a viewfinder zoom and focus adjustment 312.

Optionally, a processed image is also displayed using an external display 318 such as an on screen display (OSD) including one or more LCDs and/or OLEDs.

Similarly, in some embodiments a horizontal distance D2 between the rear viewfinders is also adjustable. In some embodiments, distance adjustment for distance D1 and/or D2 is effected using a keypad control panel 314.

It is noticed that it is not a requirement of the present invention that any distance be adjusted specifically by the keyboard control panel 314, and any method known in the art for adjusting distances between arrays of image sensors 304 and between two viewfinders 310 is appropriate for the present invention.

Similarly, it is disclosed that the keypad control and panel 314 or similarly any other appropriate data input means known other than a keypad control 314 can be used to control other appropriate functionality of devices of embodiments of the present invention. In some embodiments, input parameters to image processing algorithms including image distorting algorithms, classifying algorithms, or image superimposition are also controlled by a keypad control panel 314 or other appropriate device for receiving user input.

In some embodiments, disclosed viewing devices include a playback device, for displaying one or more prerecorded images through one or more viewfinders. Thus, it is now disclosed for the first time an augmented reality device with one or more real time distorted images superimposed on prerecorded images.

In some embodiments, the disclosed device includes an image recording device, for recording a processed image.

Figure 3:
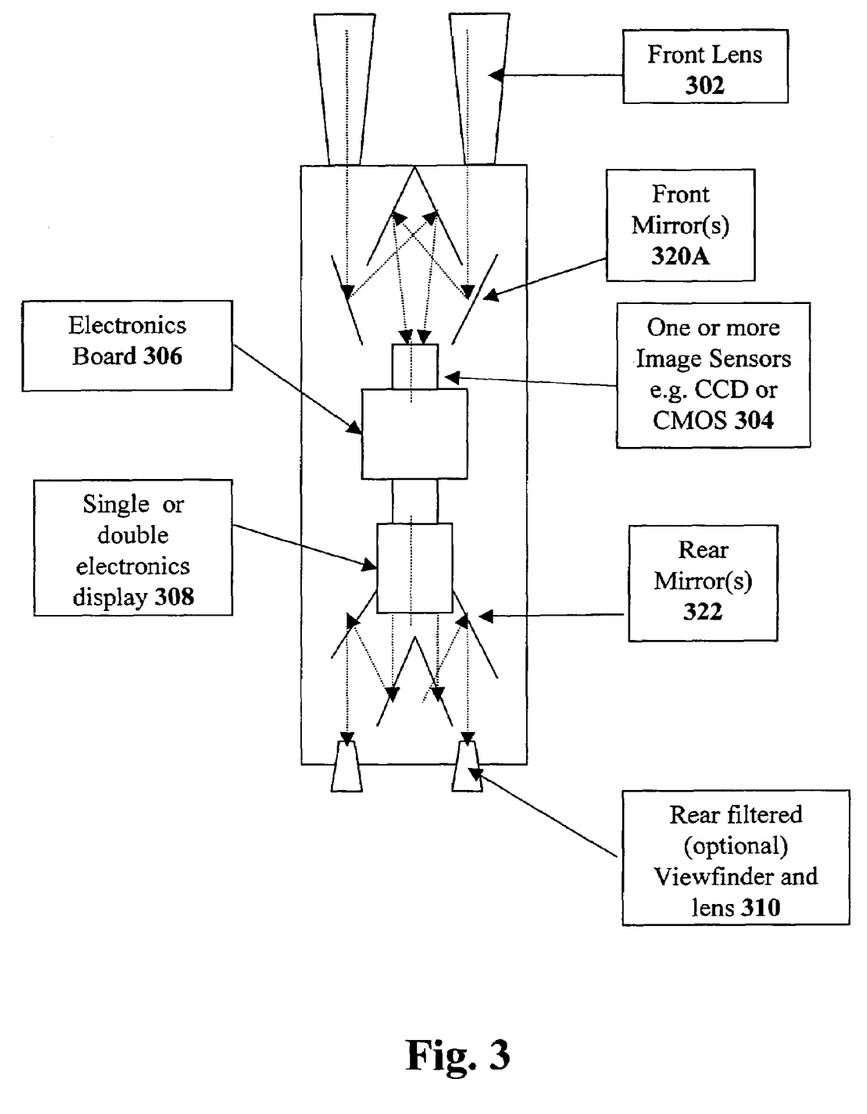

FIG. 3 provides an illustration of some embodiments of the invention.

Device for Optically Producing a Hybrid Image

Figure 4:
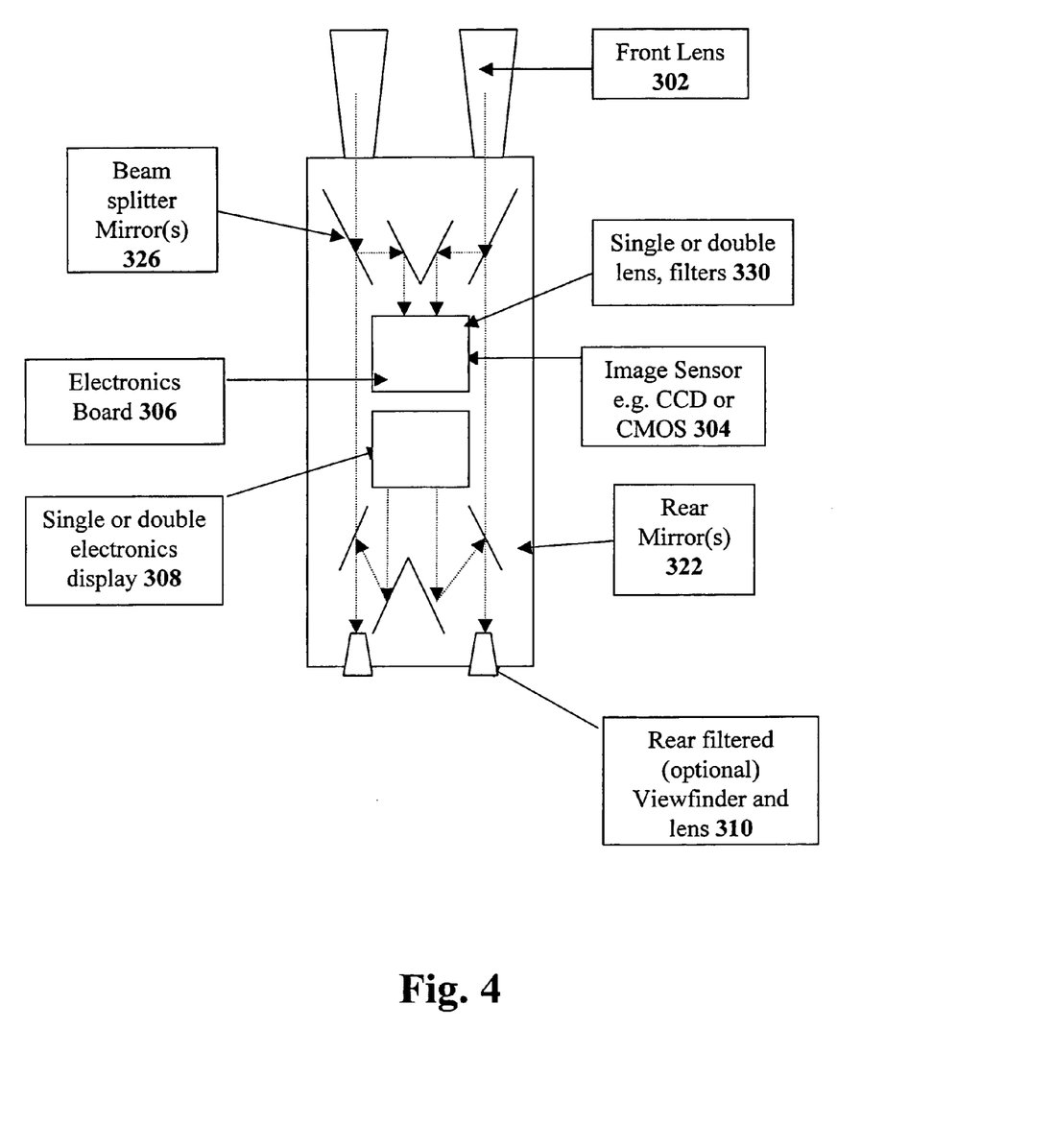

FIG. 4 provides an illustration of an electronic viewing device whereby a real time distorted image is optically superimposed on an optical observed image. Thus, in FIG. 4 a beam splitter/mirror device 326 diverts some incident light to an image sensor for generation of a real time distorted electronic image. Some light bypasses the image processing device and is directed by the beam splitter/mirror device 326 to the rear viewfinder. Thus, the device is FIG. 4 provides for the superimposition of an observed optical image onto a distorted electronic real time image producing a viewed real time hybrid image.

Single Optical Sensor and/or Single Display Binocular Devices

It is now disclosed for the first time an electronic binocular device for 3D viewing that includes exactly one optical sensor. Furthermore, is now disclosed for the first time an electronic binocular device for 3D viewing that includes exactly one display device.

Not wishing to be bound by theory, it is disclosed that in some embodiments, use of a single optical sensor and/or a single electronic optical display panel can lead to a Bill of Material financial savings. All aforementioned disclosed electronic viewing device have been disclosed in the context of electronic viewing devices that produce a distorted image. Nevertheless, it is noted that in some embodiments, electronic binoculars disclosed herein including exactly one optical sensor and/or exactly one electronic optical display panel display an electronically preserved image, and include image processing devices that output a preserved real time electronic image, rather than an electronic image distorted by a distortion algorithm.

In other embodiments, electronic binoculars disclosed herein with exactly one optical sensor and/or exactly one electronic display panel configured to output a distorted and/or modified image.

Figure 5:
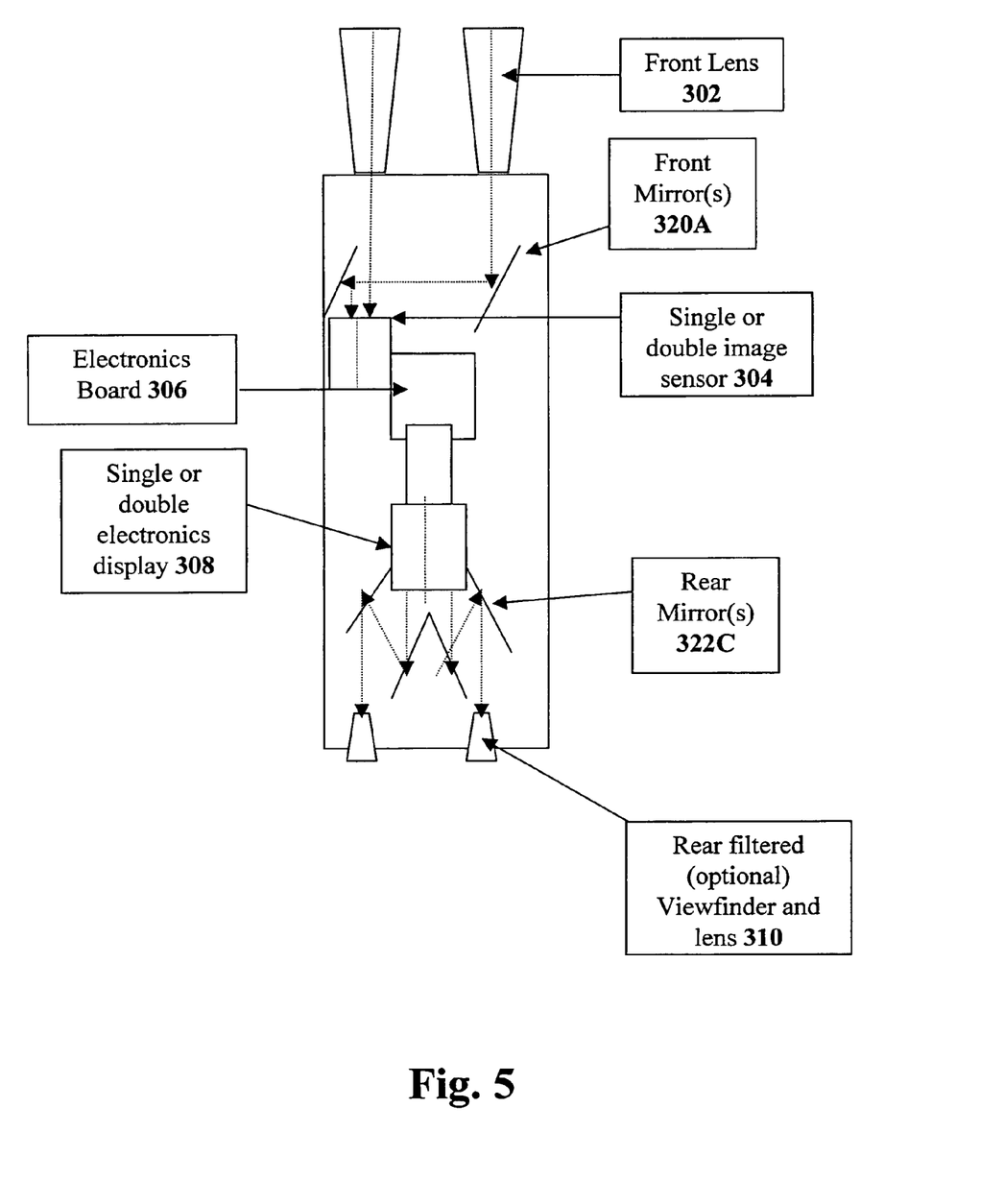
Figure 6:
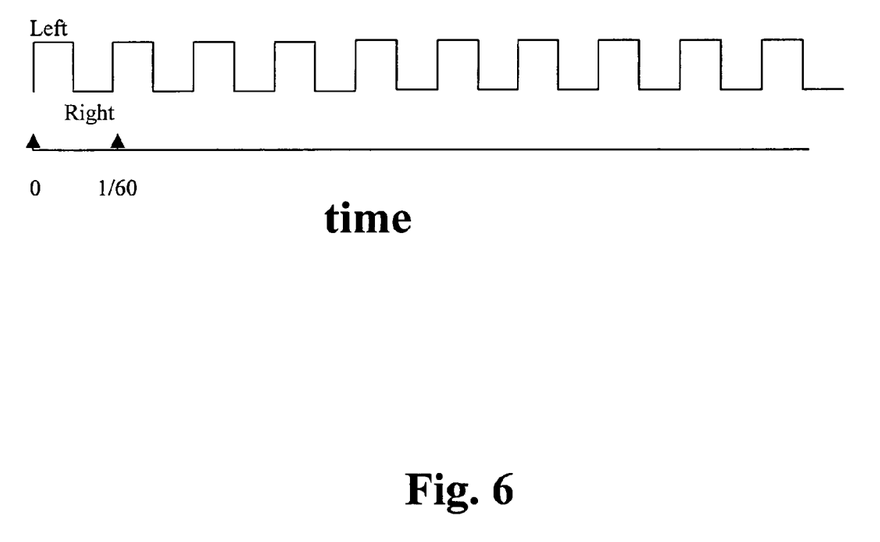
FIG. 6 provides a diagram describing image flickering according to some embodiments of the present invention.

Exemplary electronic binoculars including exactly one optical sensor and/or exactly one electronic optical display device are provided in FIG. 5. In order to produce an image such that a user experiences a 3D sensation, flickering between the left and right processing paths at a certain rate is required. In some exemplary embodiments, the flickering is produced by a mechanical shutter (not shown) situated so as to alternately direct to the single optical sensor incident light from a left and right front lens. In exemplary embodiments, the flickering is at a rate that is substantially 120 HZ, and single optical sensor alternately receives incident light from the left and right front lenses for a period of time that is substantially 1/60 seconds (FIG. 6).

Not wishing to be bound by theory, it is noted that a flickering rate less than 120 HZ is also possible, but a device with this lower rate is susceptible to generating noticeable flickering between a left and right scene.

It is noted that the mechanical shutter is not the only way to provide the flickering. In other embodiments, the single electronic optical sensor is divided into a first region for receiving incident light from a left lens, and a second region for receiving incident light from a right lense, and the flickering is provided electronically.

In exemplary embodiments, the electronic binoculars for producing a sensed 3D image of FIG. 5 includes a single image display panel such as an LCD. In some embodiments, the 3D sensation is produced by flickering between a left and right image displayed on the image display panel at flicker rates described above.

Alternately, both a left and right image are simultaneously displayed on a single image display panel, which is appropriately divided into a first and second display region. In one embodiment shown in FIG. 5, an array of rear mirrors and/or beam spliters 322C are appropriately arranged to send the appropriate left image through a left viewfinder and the appropriate right image through a right viewfinder.

Optionally, the left image is masked by tinting with a first color, and the right image is masked by tinting with a second color. In exemplary embodiments the color tinting is provided electronically in the display device, in the front lenses and/or in the rear viewfinder. Not wishing to be bound by theory, it is disclosed the differential color tinting between a left and a right viewed image eases a process by which a viewer discerns between a left and right image, increasing the separatibility between simultaneously displayed left and right images allowing a viewer to experience a displayed 3D visual manifold.

Image Classification Device

It is now disclosed for the first time an electronic viewing device for displaying symbolic data such as alphanumeric data derived from an image classifier superimposed upon a processed image representing a real time visual scenario such as a 3D visual manifold.

Figure 9A:
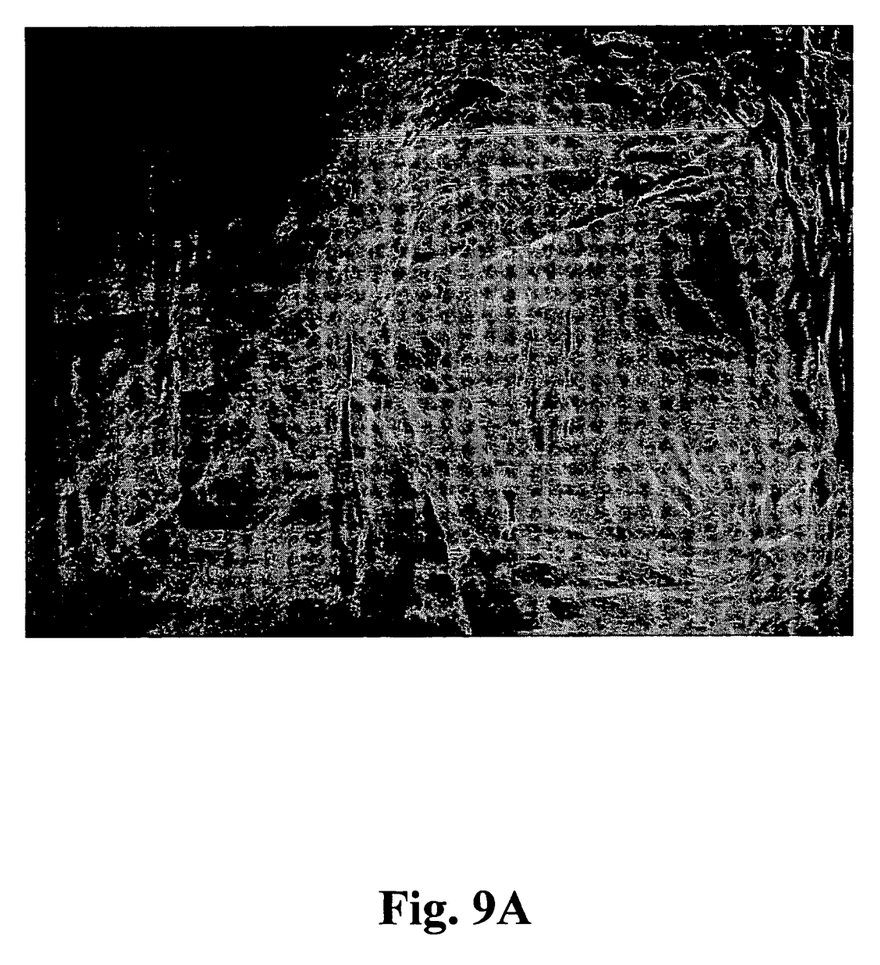
FIGS. 9A-9B provide modified electronic images including distorted images according to some embodiments of the present invention.
Figure 9B:
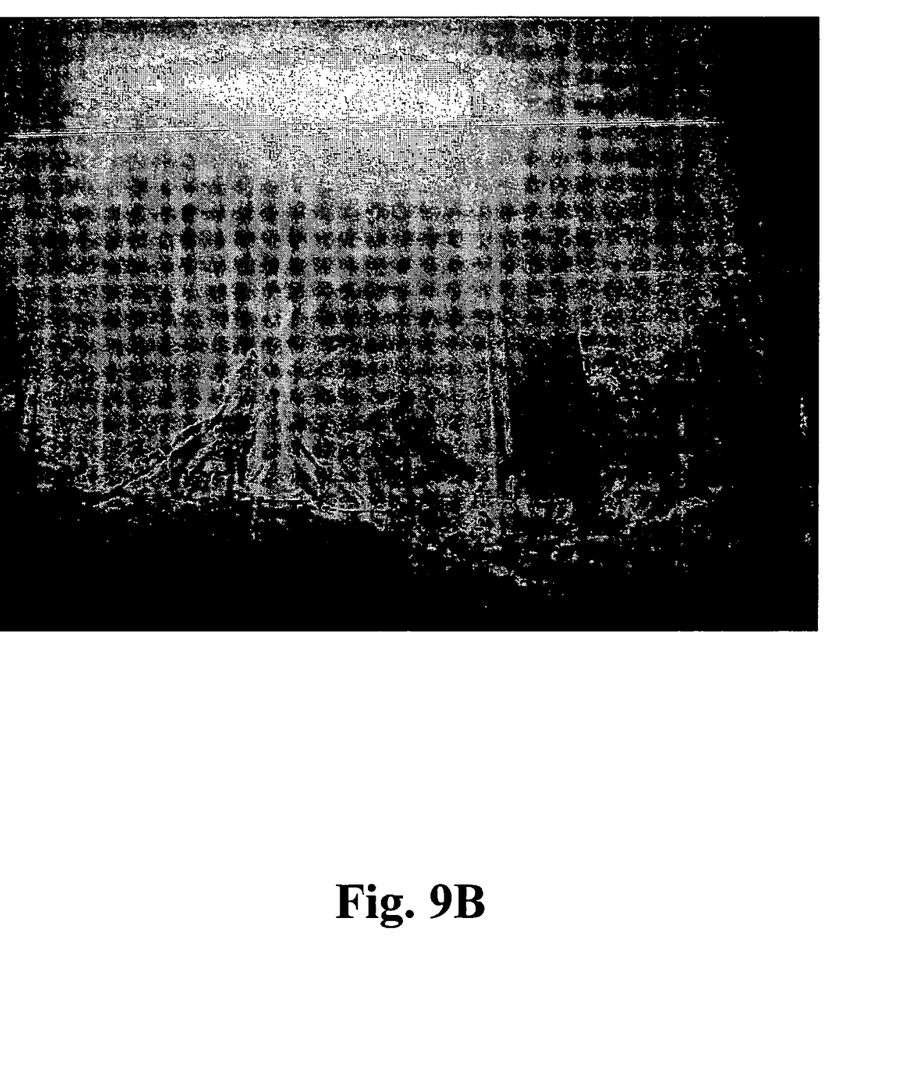
Figure 10:
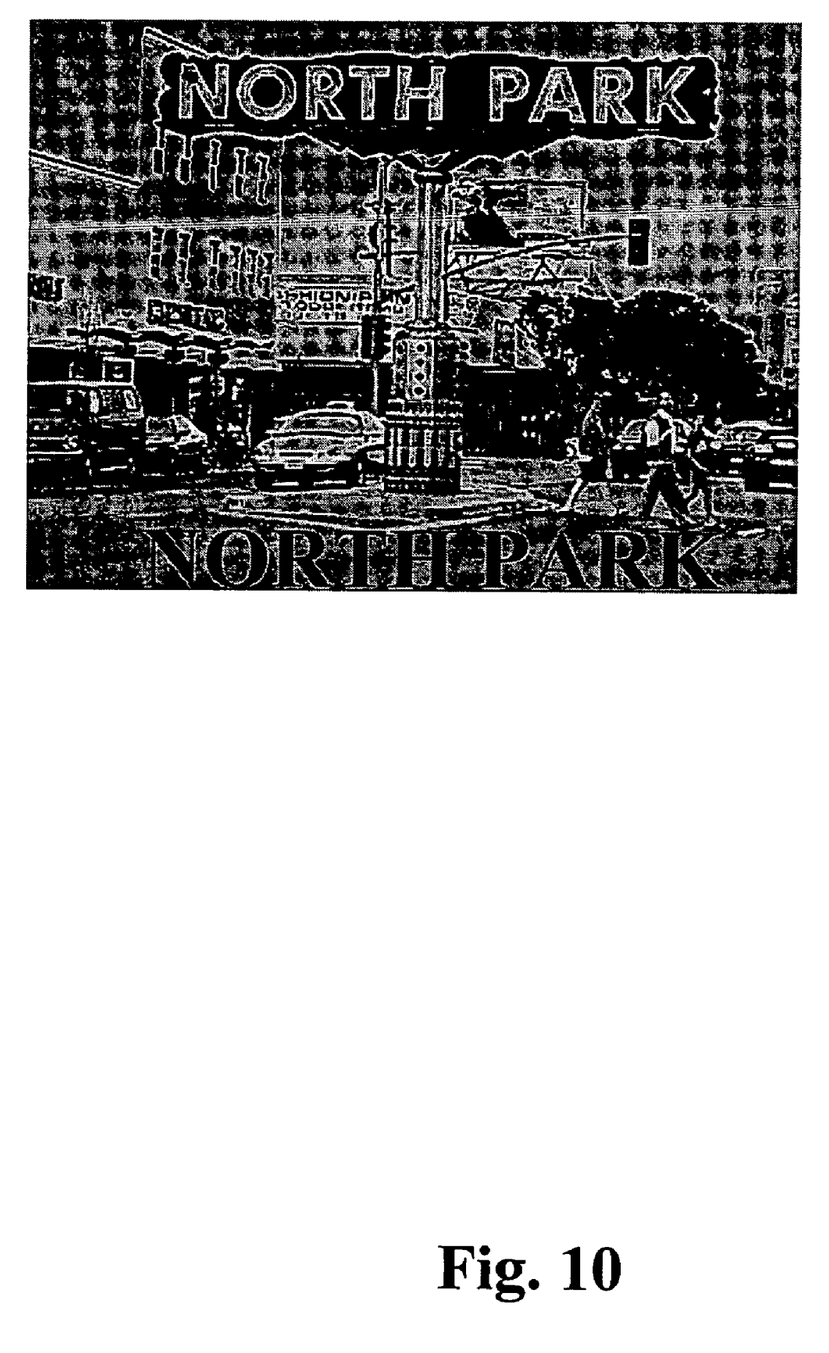
FIG. 10 provides an image with alphanumerical data from optical character recognition superimposed on the image.

In some embodiments, the disclosed device includes an image classifier. In one exemplary embodiment, the image classifier implements optical character recognition, and the device superimposes recognized characters on an observed image and/or an electronic image including a preserved electronic image as shown in FIG. 9. Optionally, the recognized characters are further translated to a target language. The military applications of this embodiment have not escaped the attention of the present inventor.

As used herein, alphanumeric data includes any character from any alphabet including not indo-European alphabets such as Japanese or Chinese characters. Furthermore, alphanumeric data includes any digital, as well as punctuation characters, etc.

The numerous innovative teachings of the present application are described below with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Additional Disclosure Related to Image Distortion

Figure 7:
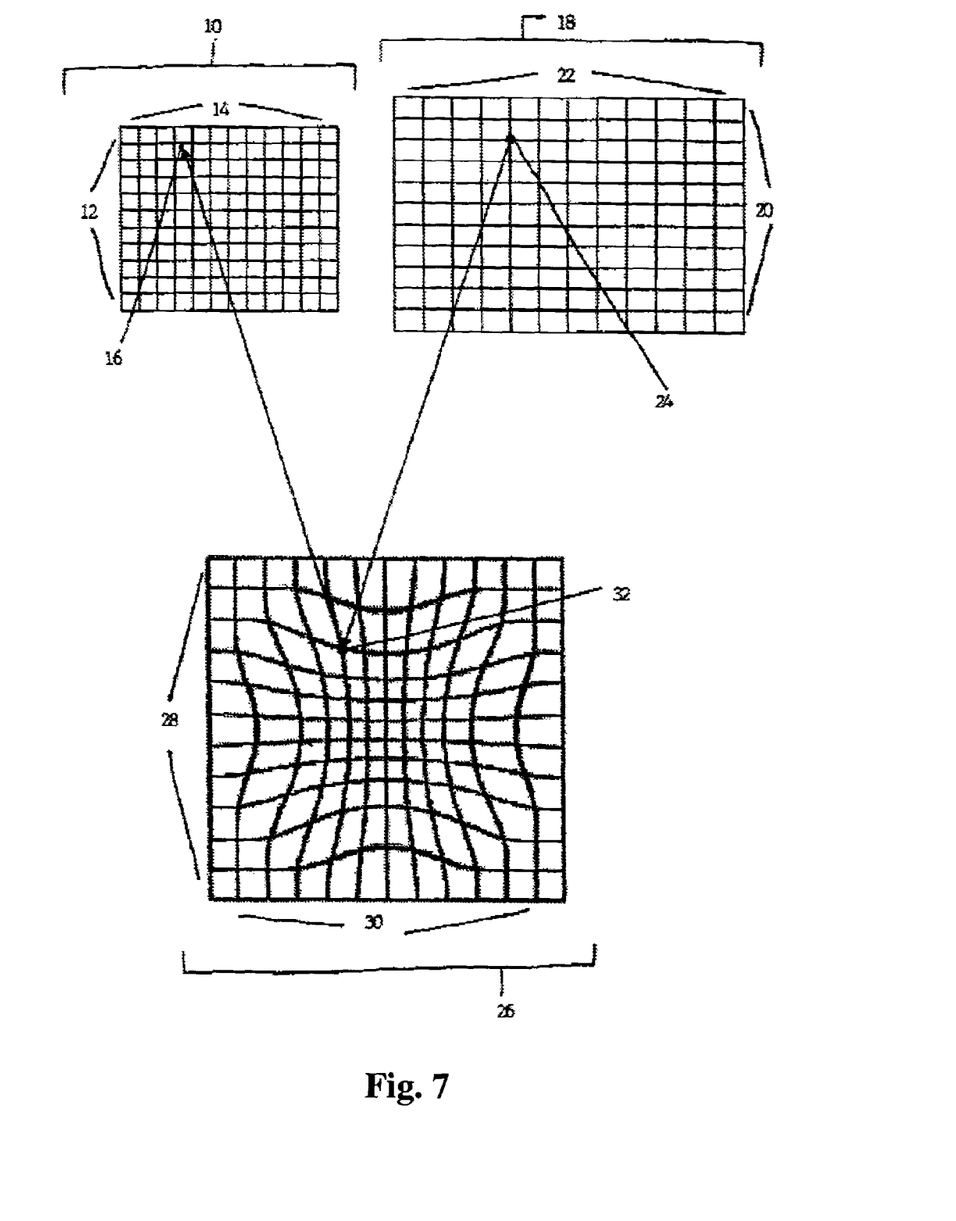
FIG. 7 provides a diagram of a distortion algorithm including a coordinate transformation.
Figure 8A:
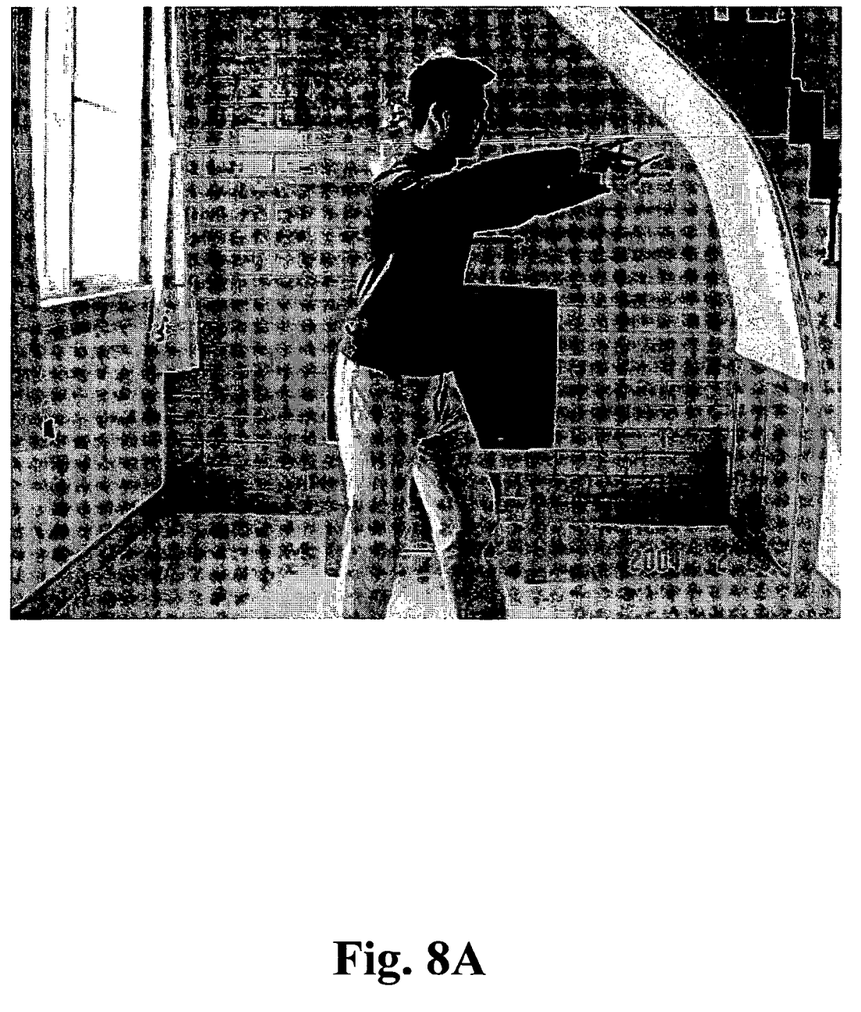
FIGS. 8A-8A provide undistorted or preserved electronic images.
Figure 8B:
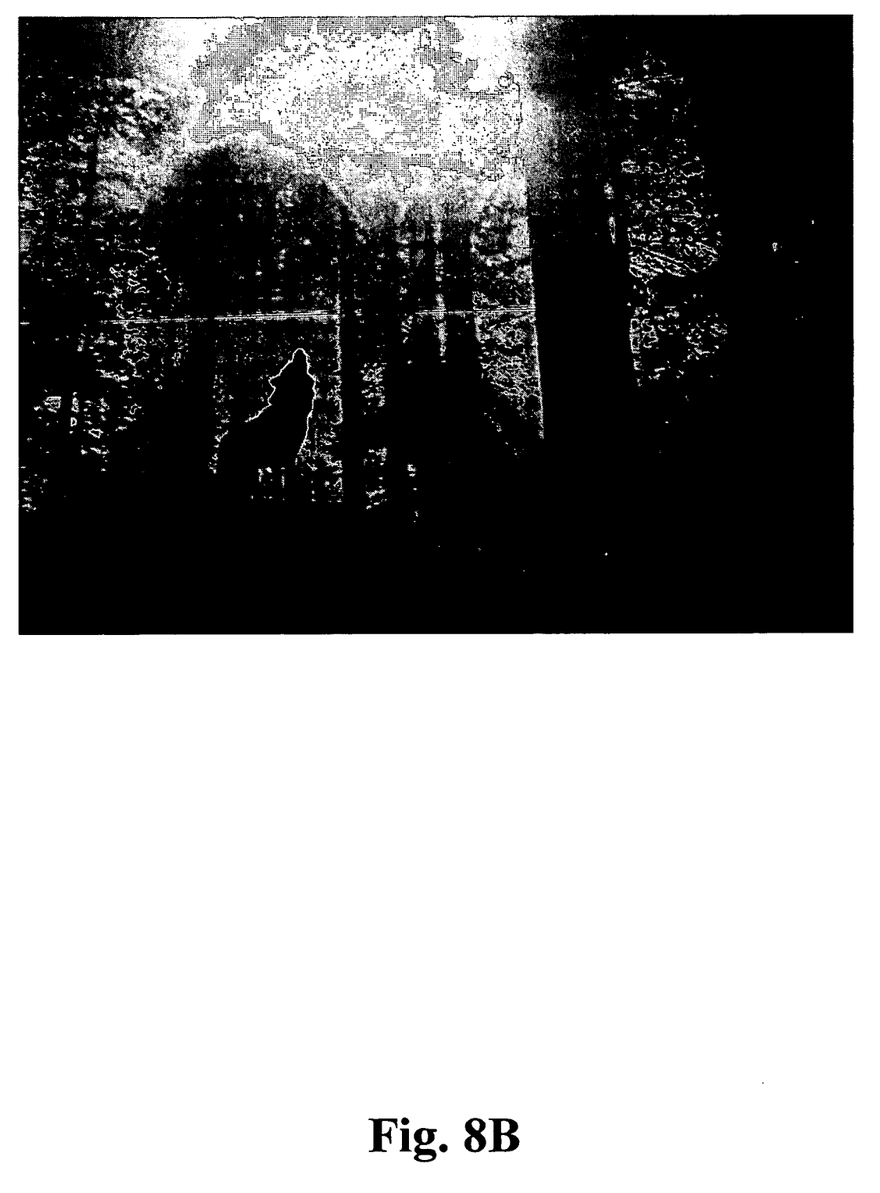

The general idea of quantifying distortion is provided by the theory of coordinate transformation for distortion applied by the use of transform one coordinate system into other. A particular example of such coordinate transformation is LIE group coordinate transformation applied over certain differential manifold. Such transformation is quantified as follows:

$$\overline{X}'=\overline{F}(\overline{X},\overline{C})=(F_1(\overline{X},\overline{C}),\ldots,F_N(\overline{X},\overline{C}))$$

where the state vector dimension is N and the dimension of the parameter vector C is K. If the transformation is of group type and smooth it is called Lie group. The coordinate transformation distortion is quantified by the parameter vector C.

The following non-limiting examples are for illustrative purposes only, and are not intended to limit the scope of the claimed invention.

EXAMPLES

Example 1

Shift in 1D space $$X'=X+C0$$

Example 2

Scale in 2D space $$X'=aX$$

$$Y'=bY$$

wherein the parameters consisting of a and b are greater than zero.

Example 3

Non linear 2D distortion:

$$X'=X+C1$$

$$Y'=XY/(X+C1)$$

In addition to coordinate transformation a color coordinate transformation is also considered as in the following particular example:

Example 4

$$\overline{V}'=\overline{G}(\overline{V},\overline{C})=(G_1(\overline{V},\overline{C}),\ldots,G_N(\overline{V},\overline{C}))$$

Where V' has dimension N. The particular case where N=3 the color vector representing for example the Red, Green and Blue colors, i.e. V=(R,G,B). The new color coordinate system V' represents the image after color coordinate change. If V' is of group structure then the transformation is of Lie structure.

In some embodiments, image distortion is described by coordinate transformation, color transformation, value transformation and time transformation or their combination, i.e.

$$R'=H_1(R',G',B',x',y',t',D)$$

$$G'=H_2(R',G',B',x',y',t',P)$$

$$B'=H_3(R',G',B',x',y',t',U)$$

where R',G',B',x',y',t' represent new spatial, temporal and color space and H1,H2,H3 are the value transformation such as Fourier Transform over the new coordinate system. The vectors D,P,U are the free parameters adjusting or quantifying the transformations. The above examples are not the only possible structure for image/video distortion. Operator type which transform the image from one space into new one is considered as a distortion. For example, wavelet or Fourier Transform may be considered as distortion.

The color transformations were recited in terms of changing red (R), green (G) and/or blue (B) values. In some embodiments, the R/G/B values range from 0 to 255. Nevertheless, it is understood that this is only one way of representing a color.

Usually video signal input is formatted as YCbCr and it is lineally connected to the RGB space. If video input is at different color space (format) such as YUV, YCrCb, YIQ, HIQ, etc. there is a transformation linear or non linear that convert any color space to the RGB color space. Therefore without reducing the generality of the concept under consideration we are assuming the common spatial temporal RGB color space.

Thus, a color transformation recited in terms of RGB values should not be seen as a limitation, and in some embodiments, representations of color other than RGB values are employed, and the production of the distortion image includes a color transformation expressed as a linear or non-linear transformation of values associated with a color representation other than red (R)/green(G)/blue(B) values.

Without reducing generality to only three basic colors the concept presented in this invention is applicable to any set of wavelengths. The reason we are focusing on video RGB visible wavelength is due to its common use.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. An electronic binoculars devices comprising:
   a) a housing;
   b) a left front lens for receiving incoming natural light from a scene, the left front lens being attached to the housing;
   c) a right front lens for receiving incoming natural light from the scene, the right front lens being attached to the housing;
   d) at least one image sensor attached to the housing, the at least one image sensor being operative to effect at least one of:
      i) sensing natural light received from the left front lens to generate a left sensed electronic image; and
      ii) sensing natural light received from the right front lens to generate a right sensed electronic image;
   e) at least one image processing unit attached to the housing, the at least one image processing unit configured to produce at least one of:
      i) a left distorted electronic image from the left sensed electronic image;
      ii) a right distorted electronic image from the right sensed electronic image;
   f) a left rear viewfinder attached to the housing configured for viewing a first combination of:
      i) natural light from the scene received via at least one of the front lenses;
      ii) at least one of the distorted images;
   g) a right rear viewfinder attached to the housing configured for viewing a second combination of:
      i) natural light from the scene received via at least one of the front lenses;
      ii) at least one of the distorted images;
   wherein:
      i) the second combination is different from the first combination such that different scenes are viewable in the left and right rear viewfinders;
      ii) at least one given viewfinder of the left and right rear viewfinder is configured for blended scene viewing such that at least one of the first combination and the second combination is a blend including both:
         A) natural light from the scene received via at least one of the front lenses; and
         B) at least one of the distorted electronic images; and
      iii) the device is further configured such that:
         A) at least one of the left distorted electronic image and natural light from the left front lens is viewable via at least one of the left rear viewfinder and the right rear viewfinder; and
         B) at least one of the right electronic distorted image and natural light from the right front lens is viewable via at least one of the left rear viewfinder and the right rear viewfinder.

2. The device of claim 1 said at least one image processing unit is operative such that said production of at least one said distorted image includes using at least one distorting algorithm selected from the group consisting of local Fourier transformations, convolutions, neural network, algorithms that introduce white noise, wavelets, partial differential operator transformations, algorithms where the output is the solution to a partial differential equations wherein on or more parameters of the partial differential equation are derived from an inputted image, equations, finite impulse response (FIR), infinite impulse response (IIR) filters, fractal based algorithms, Fractal mechanism, Algebraic technique such as iterative processing algorithms, and any combination thereof.

3. The electronic viewing device of claim 1 wherein at least one said image sensor is selected from the group consisting of visible light sensor, magnetic sensor, heat sensor, uv sensor, microphone, infra red sensor, echo location sensor, radio location sensor, remote location reporting sensor, smell sensor, wind sensor, air material sensor, proximity sensor, motion sensor, and any combination thereof.

4. The binoculars device of claim 1 wherein a distance between said left and right viewfinders is adjustable.

5. The binoculars device of claim 1 further comprising: f) a control device, for controlling parameters associated with an image distortion algorithm for generating at least one of the left distorted image and the right distorted image.

6. The binoculars device of claim 1 wherein both the left and the right rear viewfinder are configured for blended scene viewing such that both of the first combination and the second combination is a blend including both:
   i) natural light from the scene received via at least one of the front lenses; and
   ii) at least one of the distorted images.

7. The binoculars device of claim 1 further comprising:
h) at least one beam splitter for splitting incoming natural light of the scene received via at least one of left front lens and the right front lens to produce, from the incoming natural light, a first light portion and a second light portion,
wherein the binoculars device is configured such that:
  i) at least one of the left and right sensed electronic image is derived from the first light portion;
  ii) at least one of the left and right distorted images is derived from at least sensed electronic image derived from the first light portion;
  ii) at least one of the left and the right rear viewfinders is configured for hybrid scene viewing of a blend of:
    i) the second light portion; and
    ii) at least one distorted image derived from the first light portion.

8. The binoculars device of claim 7 wherein the binocular device is configured so that:
  i) natural light received via the left front lens travels via a straight line to the left rear viewfinder such that the straight-line travelling light is viewable via the left rear viewfinder; and
  ii) the left rear viewfinder is configured for hybrid scene viewing such that the first combination includes a blend of:
    A) the straight-line travelling natural light received via the left front lens; and
    B) at least one of the left distorted image and the right distorted image.

9. The binoculars device of claim 7 wherein the binocular device is configured so that:
  i) natural light received via the right front lens travels via a straight line to the right rear viewfinder such that the straight-line travelling light is viewable via the right rear viewfinder; and
  ii) the right rear viewfinder is configured for hybrid scene viewing such that the first combination includes a blend of:
    A) the straight-line travelling natural light received via the left front lens; and
    B) at least one of the left distorted image and the right distorted image.

10. The binoculars device of claim 1 wherein the at least one image sensor includes a first image sensor and a second image sensor of a type different than the first image sensor, and the left image is derived from the first image sensor and the right image is derived from the second image sensor.

11. The binoculars device of claim 1 wherein the left distorted image is derived according to a first set of image processing algorithms, the right distorted image is derived according to a second set of image processing algorithms, and said first set of image processing algorithms differs from said second set of image processing algorithms.

12. The binoculars device of claim 1 further comprising:
h) at least one image display unit for displaying at least one of the left and right distorted images.

13. The binoculars device of claim 1 wherein the binoculars device lacks a microscope and wherein natural light from the scene received via the front lenses which is viewable one or both of the rear viewfinders is not magnified by a microscope.

14. The binoculars device of claim 1 wherein the at least one image processing unit is operative such that production of the distorted image includes a coordinate transformation.

15. The binoculars device of claim 1 wherein the at least one image processing unit is operative such that production of the distorted image includes a time transformation.

16. The binoculars device of claim 1 wherein the at least one image processing unit is operative such that production of the distorted image includes a color transformation.

17. The binoculars device of claim 1 wherein the at least one image processing unit is operative such that production of the distorted image includes a coordinate transformation.

18. The binoculars device of claim 1 wherein the at least one image sensor includes a visible light sensor and a uv sensor for generating a uv image.

19. The binoculars device of claim 1 further comprising:
h) a control device is operative to control the relative intensity of
  i) natural light received via the given viewfinder; and
  ii) light of one or more distorted electronic images viewable via the given viewfinder.

* * * * *